United States Patent [19]

Schacht et al.

[11] Patent Number: 5,688,589
[45] Date of Patent: Nov. 18, 1997

[54] SELF-ADHESIVE TAPE

[75] Inventors: Wolfgang Schacht, Neu Wulmsdorf; Robert Gereke, Braunschweig; Frank Henke, Neu Wulmsdorf/Elsdorf; Holger Hoffmann, Wedemark, all of Germany

[73] Assignee: Beiersdorf AG, Hamburg, Germany

[21] Appl. No.: 604,511

[22] Filed: Feb. 21, 1996

[30] Foreign Application Priority Data

Feb. 23, 1995 [DE] Germany ............... 195 06 250.7

[51] Int. Cl.⁶ ............................................. C09J 7/02
[52] U.S. Cl. ................................. 428/317.3; 428/354
[58] Field of Search ........................ 428/354, 355, 428/317.3

[56] References Cited

U.S. PATENT DOCUMENTS

| | | |
|---|---|---|
| 3,648,835 | 3/1972 | Yucel . |
| 4,061,805 | 12/1977 | Thompson et al. . |
| 4,219,459 | 8/1980 | Donermeyer . |
| 4,440,829 | 4/1984 | Gerace et al. . |
| 4,666,771 | 5/1987 | Vesley . |
| 4,780,491 | 10/1988 | Vesley . |
| 5,008,139 | 4/1991 | Ochi . |
| 5,096,777 | 3/1992 | Schacht . |

FOREIGN PATENT DOCUMENTS

| | | |
|---|---|---|
| 0601582 | 6/1994 | European Pat. Off. . |
| 2105877 | 7/1979 | Germany . |
| 3303834 | 8/1984 | Germany . |
| 2821606 | 10/1984 | Germany . |
| 4029896 | 6/1991 | Germany . |
| 8400130 | 1/1984 | WIPO . |

OTHER PUBLICATIONS

Abstract of JP 57–044 686.
Abstract of JP 55–041 267.
Abstract of JP 54–047 737.

*Primary Examiner*—Jenna Davis
*Attorney, Agent, or Firm*—Sprung Kramer Schaefer & Briscoe

[57] ABSTRACT

Pressure-sensitive self-adhesive tape comprising a backing made of general purpose rubber, the backing being coated on both sides with pressure-sensitive adhesive compositions.

11 Claims, No Drawings

SELF-ADHESIVE TAPE

The invention relates to a double-sided self-adhesive tape as is employed in particular for obtaining low temperature-resistant adhesive bonds.

In order to achieve high levels of resistance to peeling and to shear forces, the use of various adhesive tapes is known.

DE-C 21 05 877 indicates an adhesive tape consisting of a backing which is coated on at least one side with a microcellular pressure-sensitive adhesive and whose adhesive coat includes a nucleating agent, the cells of the adhesive coat being closed and distributed throughout the adhesive coat. This adhesive tape is able to adapt to the irregular surface to which it is applied and can therefore lead to a relatively permanent adhesive bond, but also displays only little recovery when it has been compressed to half its original thickness. However, the cavities in the adhesive composition offer entry points for the lateral incursion of solvents and water into the adhesive joint, which is highly undesirable in the case of the adhesively bonded trim strips in automotive construction, for example. In addition, it is impossible to rule out the complete passage of solvents or water through the entire adhesive tape.

DE-C 28 21 606 thus describes a pressure-sensitive adhesive tape having an adhesive coat which is on a backing material and in which hollow glass microspheres are dispersed in a proportion of up to 60 percent by volume of the adhesive coat. Because of its structure, this adhesive tape offers good resistance to the stress phenomena mentioned above. This is because the tape possesses the technical advantage of showing virtually no lifting from sites of unevenness in the substrate, since it lacks elastic recovery after a pressure has been exerted on said tape for a period of time. However, this adhesive tape too has some disadvantages. For instance, hollow glass microspheres are highly sensitive entities which, during incorporation into the adhesive coat, during storage, and especially when the tape is used, have a tendency to shatter, then creating follow-on problems owing to the splinters which are produced.

DE-A 40 29 896 describes a double-sided self-adhesive tape which has no backing and comprises a pressure-sensitive adhesive coat containing solid glass microspheres. True, relative to the abovementioned adhesive tape this adhesive tape has the undisputed property of leading to more permanent bonds, but owing to the solid spheres used it has a very high specific gravity, and owing to the solid glass microspheres its utility is limited.

All of the adhesive tapes specified have the common feature that the degree to which the shear forces which act on the adhesive bond can be absorbed is for many applications insufficient to ensure a permanent bond between the substrate and the article which is to be mounted using the adhesive tape. Especially at relatively low temperatures, the possibility of using such adhesive tapes is very limited, since at low temperatures the backing becomes brittle, with the result that the adhesive tape is no longer able to maintain the desired adhesive bond.

The object of the invention is to create a self-adhesive tape from which the disadvantages of the prior art are absent or in which they are at least diminished and which nevertheless is not, like the prior products, limited in its utility.

To achieve this object, the invention proposes a pressure-sensitive self-adhesive tape coated on both sides with adhesive compositions, which has a backing produced from a general purpose rubber.

The self-adhesive tape exhibits outstanding, unforeseeable properties. Owing to the high flexibility of the backing the adhesive tape adapts very well to an uneven substrate when pressed onto this substrate with a certain pressure. This produces a highly permanent bond between adhesive tape and substrate, which does not fail even under the action of high shear forces on the self-adhesive tape. Because of the absence from the backing of cavities open at the side, the possible penetration of solvents or water into the adhesive tape, with all its known disadvantages, is also prevented. Moreover, because of the very low glass transition point of the adhesive tape according to the invention, low-temperature applications of down to −40° C. are possible, since the embrittlement otherwise observed with known adhesive tapes does not occur, so that optimum adhesion of the adhesive tape is ensured even at these extreme temperatures.

One example of such a low-temperature application is in the mounting of trim strips or mirrors in automotive construction, when the vehicle is driven in more northerly and colder regions of the earth.

The invention is also used, apart from in the automotive industry, in particular in the furniture industry, where there is likewise a need to anchor mirrors, trimmings or covers permanently to the substrate.

In view of the outstanding product properties, however, the use of the invention is not restricted to the examples given. Rather, the use of the adhesive tape is possible in numerous sectors of industry as an assembly material when the task involved is to create a secure bond between two components of very different materials on a relatively uneven surface.

The material employed for the backing is a general purpose rubber. General purpose rubbers in this context are, in particular, either a natural rubber, styrene-butadiene rubber, butyl rubber or butadiene rubber or a blend of two or more of these rubbers, but preferably a natural rubber. To formulate specifically for desired properties of the backing it is possible, if desired, to use fillers. For instance, it is possible to add to the general purpose rubber carbon black from the series of the reinforcing, semireinforcing or non-reinforcing carbon blacks, in particular 0–80 phr, zinc oxide, in particular 0–70 phr, and/or other fillers, such as silica, silicates, chalk or glass microspheres. The use of fillers other than those mentioned is also possible. Furthermore, resins from the class of the phenolic resins and/or hydrocarbon resins can also be added, in particular in the range 0–75 phr. In order to increase the durability of the adhesive tape it can be filled with customary antiaging agents, which depending on the particular application can come from the class of the discoloring or nondiscoloring antiaging agents, especially in the range 0–10 phr, and with known light stabilizers or ozone protection agents. Also possible is the admixing of vulcanizing agents (for example sulfur, sulfur donors, accelerators or peroxides) and/or the addition of fatty acid, in particular in the range 0–10 phr, and the use of plasticizers or accelerators. All of these additives mentioned can, depending on the intended use of the self-adhesive tape, be employed either alone or in any desired combination with one another to prepare the rubber mixture, in order to obtain an optimum degree of harmonization with the application. By using these additives it is also possible without problems to provide the backing with the black coloration desired, in particular, by the motor vehicle industry.

Express reference is made to the known technology of the processing of general purpose rubber and to the known additives which can be employed for this purpose, for example in accordance with the book by Werner Kleemann (Werner Kleemann: "Mischungen für die Elastverarbeitung"

[Mixtures for the processing of elastomers], Deutscher Verlag für Grundstoffindustrie, Leipzig 1982).

In an advantageous embodiment, which is given by the use of solid microspheres in the rubber backing coat, the self-adhesive tape exhibits properties which are improved still further and are also surprising to the person skilled in the art, especially if the solid microspheres are present in the backing coat in a volume proportion of from 1% by volume to 50% by volume, in particular from 10% by volume to 30% by volume.

The solid microspheres used predominantly in this context are solid glass microspheres (glass microballs) having a diameter of from 1 μm to 100 μm, in particular from 10 μm to 60 μm, and a density of from 1.8 g/cm$^3$ to 6.0 g/cm$^3$, in particular from 1.9 g/cm$^3$ to 4.0 g/cm$^3$.

The self-adhesive tape having the solid microspheres in the rubber backing coat is particularly suitable for ensuring, on an uneven substrate, a permanent bond of the self-adhesive tape with the substrate. Even very high shear forces are unable to result in failure of the highly load-bearing bond.

The backing mixture is preferably prepared in an internal mixer which is typical for elastomer compounding. In this procedure, the rubber mixture is adjusted in particular to a Mooney value $ML_{1+3}$ (100° C.) in the range 40–80. Processing is preferably carried out without solvent. The rubber mixture can then be extruded and/or calendered to the desired thickness on customary commercial machines, to give a thickness of the backing in the range from 0.4 to 5 mm, preferably from 0.6 to 2 mm.

One option subsequently is to carry out electron beam curing.

In order to increase the anchoring of the adhesive composition on the rubber backing, it is possible to add known coupling agents. A known primer coating can also be applied to the backing. Alternatively, the backing can be subjected to a corona pretreatment. To obtain particularly firm anchoring, a combination of these methods is also possible. The adhesive composition itself can be applied directly, by the indirect transfer method or by coextrusion with the backing, from solution, dispersion or the melt. In the case of coextrusion in particular, it is advantageous to carry out in-line crosslinking of backing and adhesive composition by means of electron beam curing. The weight of adhesive composition applied can likewise be chosen as desired, depending on the intended application, within the range 10–250 g/m$^2$, preferably 40–150 g/m$^2$.

EXAMPLE

The backing mixture is prepared in an internal mixer typical of those used for elastomer compounding. In this procedure, the rubber mixture is adjusted to a Mooney value $ML_{1+3}$ (100° C.) of 65.

The specific composition of the mixture is as follows:

| Component | Proportion (phr) |
| --- | --- |
| Natural rubber SMR 10 | 100.00 |
| HAF carbon black | 25.0 |
| Zinc oxide | 8.0 |
| Phenolic resin | 3.5 |
| Sontal antiaging agent | 1.8 |
| Sulfur | 0.9 |
| Accelerator (sulfenamide type) | 0.9 |

The rubber mixture is then drawn out on a commercial elastomer calender to give a rubber web having a thickness of 0.8 mm.

The chemical crosslinking of the backing (=sulfur crosslinking) takes place in a vulcanization press typical of those used for elastomer processing, at a temperature of from 140° to 160° C. for a residence time of from 5 to 15 minutes. Crosslinking is followed directly by intensive corona treatment on both sides. To prevent blocking of the material, a nonwoven material is included during winding.

After vulcanization curing the backing has an elongation at break of <700% and a strength of >10 N/mm$^2$.

The material is subsequently coated in two steps on both sides with 60 g/m$^2$ per side of the polyacrylate composition Duroctac 280-1753 from National Starch. Following a further in-line corona treatment, the solvent composition is coated directly onto the backing; this is followed by crosslinking at 100° C. and drying.

The double-sided adhesive tape, covered on one side with release paper, is distinguished by high adhesion coupled with high shear strength, and the adhesive bonds produced therewith possess an excellent low-temperature impact strength.

What is claimed is:

1. A pressure-sensitive self-adhesive tape comprising a backing made of general purpose rubber, the backing being coated on both sides with pressure-sensitive adhesive compositions, said backing containing solid microspheres present therein in a volume proportion of from 1% to 50% by volume.

2. The self-adhesive tape as claimed in claim 1, wherein the general purpose rubber is a natural rubber, a styrene-butadiene rubber, a butyl rubber, a butadiene rubber or a blend of two or more of these rubbers.

3. The self-adhesive tape as claimed in claim 1, wherein the general purpose rubber is blended with one or more additives selected from the group consisting of antiaging agents, crosslinking agents, light stabilizers, ozone protection agents, fatty acids, resins, plasticizers and accelerators.

4. The self-adhesive tape as claimed in claim 1, wherein the backing includes coupling agents in order to improve the adhesion of the adhesive compositions.

5. The self-adhesive tape as claimed in claim 1, wherein the backing is filled with one or more fillers selected from the group consisting of carbon black, zinc oxide, solid microspheres, silica, silicates and chalk.

6. The self-adhesive tape as claimed in claim 1, wherein the backing is chemically or physically crosslinked.

7. The self-adhesive tape as claimed in claim 1, wherein the backing has a thickness in the range of about 0.4 to 5 mm.

8. The self-adhesive tape as claimed in claim 1, wherein the solid microspheres are solid glass microspheres.

9. The self-adhesive tape as claimed in claim 8, wherein the solid glass microspheres have a diameter of from 1 μm to 100 μm, and a density of from 1 g/cm$^3$ to 6 g/cm$^3$.

10. The self-adhesive tape as claimed in claim 2, wherein the general purpose rubber is blended with one or more additives selected from the group consisting of antiaging agents, crosslinking agents, light stabilizers, ozone protection agents, fatty acids, resins, plasticizers and accelerators, the backing includes coupling agents in order to improve the adhesion of the adhesive compositions, the backing is filled with one or more fillers selected from the group consisting of carbon black, zinc oxide, solid microspheres, silica, silicates and chalk, the backing is chemically or physically crosslinked, the backing has a thickness in the range of about 0.4 to 5 mm, the solid microspheres are solid glass microspheres and are present in the backing in a volume proportion of from 10% to 30% by volume, the solid glass microspheres having a diameter from 10 to 60 μm and a density of from 1 to 4 g/cm$^3$.

11. In combination, (A) a substrate, (C) an automotive mirror or trim, and (B) a self-adhesive tape according to claim 1 securing (A) to (C).

* * * * *